(12) United States Patent
Menard et al.

(10) Patent No.: US 11,532,968 B2
(45) Date of Patent: Dec. 20, 2022

(54) LINEAR ACTUATOR FOR MOTION SIMULATOR

(71) Applicant: D-BOX TECHNOLOGIES INC., Longueuil (CA)

(72) Inventors: Jean-Francois Menard, Boucherville (CA); Andre Beaudin, Longueuil (CA); Ran Tao, Longueuil (CA); Ala Eddine Limame, St-Leonard (CA)

(73) Assignee: D-BOX TECHNOLOGIES INC., Longueuil (CA)

( * ) Notice: Subject to any disclaimer, the term of this patent is extended or adjusted under 35 U.S.C. 154(b) by 303 days.

(21) Appl. No.: 16/737,975

(22) Filed: Jan. 9, 2020

(65) Prior Publication Data
US 2020/0144891 A1     May 7, 2020

Related U.S. Application Data

(63) Continuation of application No. PCT/CA2018/050839, filed on Jul. 10, 2018.
(Continued)

(51) Int. Cl.
*H02K 7/10* (2006.01)
*H02K 11/20* (2016.01)
(Continued)

(52) U.S. Cl.
CPC ......... *H02K 7/1004* (2013.01); *A47C 1/0242* (2013.01); *A47C 3/20* (2013.01);
(Continued)

(58) Field of Classification Search
CPC ........ H02K 7/1004; H02K 11/20; H02K 7/06; H02K 7/003; A47C 1/0242; A47C 3/20;
(Continued)

(56) References Cited

U.S. PATENT DOCUMENTS 5,838,246 A * 11/1998 Voorhees ................ B66C 13/50
                                                                254/269
5,887,947 A *  3/1999 Chi ........................ A47C 1/022
                                                                297/337
(Continued)

FOREIGN PATENT DOCUMENTS

| CN | 105702117 A | 6/2016 | |
| DE | 102016118555 A1 | 3/2018 | |
| WO | WO-2019010571 A1 * | 1/2019 | ............... G01L 5/04 |

*Primary Examiner* — Tulsidas C Patel
*Assistant Examiner* — Viswanathan Subramanian
(74) *Attorney, Agent, or Firm* — Norton Rose Fulbright Canada LLP

(57) ABSTRACT

A linear actuator is configured to be connected between a platform and a structure or ground for displacement of the platform relative to the structure or the ground. The actuator comprises a base, and an output displaceable linearly relative to the base. A first plurality of idlers are on the base, and a second plurality of idlers are on the output. An actuator unit has a reciprocating rotational output. A tensioning member has a first end connected to the rotational output of the actuator unit, and a second end connected to an anchor point on one of the output and the base, the tensioning member being routed from the rotational output, through the first plurality of idlers and the second plurality of idlers and to the anchor point for converting a winding/unwinding of the tensioning member into a translation of the output.

7 Claims, 10 Drawing Sheets

Related U.S. Application Data

(60) Provisional application No. 62/530,606, filed on Jul. 10, 2017.

(51) Int. Cl.
*A47C 1/024* (2006.01)
*A47C 3/20* (2006.01)
*A47C 7/00* (2006.01)
*G09B 9/00* (2006.01)

(52) U.S. Cl.
CPC ............... *A47C 7/00* (2013.01); *H02K 11/20* (2016.01); *G09B 9/00* (2013.01)

(58) Field of Classification Search
CPC ......... A47C 7/00; A47C 1/03227; G01L 5/04; G01L 5/103
See application file for complete search history.

(56) References Cited

U.S. PATENT DOCUMENTS

| | | |
|---|---|---|
| 6,585,515 B1 | 7/2003 | Roy et al. |
| 7,325,356 B2 | 2/2008 | Norman et al. |
| 7,934,773 B2 | 5/2011 | Boulais et al. |
| 8,118,138 B2* | 2/2012 | Aulanko ............... B66B 11/007 187/264 |
| 2013/0205742 A1* | 8/2013 | Smeets ............... D07B 1/0686 57/212 |
| 2014/0070153 A1* | 3/2014 | Lin ........................ G01L 5/103 254/323 |
| 2015/0284221 A1* | 10/2015 | Hall ...................... B66D 1/485 254/342 |
| 2016/0207221 A1* | 7/2016 | Fontana ................. B28D 7/046 |
| 2017/0058600 A1* | 3/2017 | Mocanu ................... E06B 9/44 |

* cited by examiner

LINEAR ACTUATOR FOR MOTION SIMULATOR

CROSS-REFERENCE TO RELATED APPLICATION

The present application is a continuation of PCT/CA2018/050839, filed on Jul. 10, 2018, which claims priority from U.S. Patent Application Ser. No. 62/530,606, filed on Jul. 10, 2017 and incorporated herein by reference.

FIELD OF THE APPLICATION

The present application relates to linear actuators as used with motion simulators or in motion simulation, for instance to displace an occupant or occupants of a platform in synchrony with a sequence of video images.

BACKGROUND OF THE ART

In the video and televised entertainment industry, there is an increasing demand for enhancing the viewing experience of a viewer. Accordingly, there has been numerous innovations to improve the image and the sound of viewings. Motion simulation has also been developed to produce movements of a motion platform (e.g., a seat, a chair) in synchrony with sequences of images of a viewing. For instance, U.S. Pat. Nos. 6,585,515 and 7,934,773 are two examples of systems that have been created to impart motion to a seat, to enhance a viewing experience. Motion may be described as vibro-kinetic movements of a seat, for instance in the 0-100 Hz frequency range. The vibro-kinetic movements, i.e., the motion, may be at least partially encoded for the seat or platform to perform programmed movements, and may or may not include vibrations derived from a soundtrack.

Electro-mechanical linear actuators are commonly used in such motion platforms. These linear actuators must often be capable of producing low and medium amplitude outputs, at low or medium frequency, for a high number of strokes. Moreover, these linear actuators must support a portion of the weight of a platform and its occupant(s). These linear actuators are often elongated, which limits the nature of the seats or platform with which they can be used.

Such linear actuators may also be found in domestic uses. A known configuration features ball screw technology associated with an electric motor, notably because of the precision such technology may have in its higher-precision configurations, in converting rotations into translations while being load bearing. While convenient in terms of noise and efficient in terms of performance, such electro-mechanical actuators and similar electro-mechanical actuators are non-negligible in pricing.

SUMMARY OF THE APPLICATION

It is therefore an aim of the present disclosure to provide a linear actuator that addresses issues associated with the prior art.

Therefore, in accordance with a first embodiment of the present application, there is provided a linear actuator configured to be connected between a platform and a structure or ground for displacement of the platform relative to the structure or the ground, the actuator comprising: a base, an output displaceable linearly relative to the base, an actuator unit having a reciprocating rotational output, a tensioning member having a first end connected to the rotational output of the actuator unit, and at least one idler rotatably mounted on at least one of the output and the base, wherein a second end of the tensioning member is connected to an anchor point on one of the output and the base, the tensioning member being routed from the rotational output, through the at least one idler and to the anchor point for converting a winding/unwinding of the tensioning member into a translation of the output.

Further in accordance with the first embodiment, a first set of a plurality of the at least one idler is for instance on the base, and a second set of a plurality of the at least one idler is for instance on the output.

Still further in accordance with the first embodiment, all of the idlers in the first set have for instance a common rotational axis.

Still further in accordance with the first embodiment, all of the idlers in the second set have for instance a common rotational axis.

Still further in accordance with the first embodiment, the output has for instance a frame having at least one sliding rod slidingly received in at least one bushing on the base.

Still further in accordance with the first embodiment, each said sliding rod is for instance slidingly received in at least a pair of the bushing.

Still further in accordance with the first embodiment, the frame has for instance a pair of the sliding rods interconnected by a shaft.

Still further in accordance with the first embodiment, all of the idlers in the second set are for instance rotatably mounted onto the shaft.

Still further in accordance with the first embodiment, the shaft is for instance perpendicular to the sliding rods.

Still further in accordance with the first embodiment, each said sliding rods are for instance slidingly received in at least a pair of the bushing, the shaft being located within a zone delimited by a first of the sliding rods and its pair of the bushings and a second of the sliding rods and its pair of the bushings.

Still further in accordance with the first embodiment, the first set of the idlers is for instance located in the zone.

Still further in accordance with the first embodiment, the anchor point is for instance connected to the base, in the zone.

Still further in accordance with the first embodiment, at least one routing idler is for instance on the base between the rotational output and one of the first set and the second set of the idlers.

Still further in accordance with the first embodiment, the rotational output has for instance a spool with the first end of the tensioning member connected to the spool, a line extending from the first end to a proximal contact point of the tensioning member with the routing idler, the line being at an angle of at least 5 degrees relative to a shortest distance from the proximal contact point to the spool.

Still further in accordance with the first embodiment, the base has for instance a plate.

Still further in accordance with the first embodiment, the output has for instance a ground abutment.

Still further in accordance with the first embodiment, a sensor monitors for instance a tension in the tensioning member.

Still further in accordance with the first embodiment, the sensor is for instance between the second end of the tensioning member and the base.

Still further in accordance with the first embodiment, a plurality of the at least one idler is for instance on the base, and a plurality of the at least one idler is for instance on the output.

Still further in accordance with the first embodiment, there is provided for instance at least two arrangements of three of the idlers, each arrangement defined by two of the idlers sharing a common axis, and a third idler having an axis parallel to the common axis, the tensioning member being routed from a first of the two idlers, to the third idler, to a second of the two idlers, to the other of the two arrangements.

Still further in accordance with the first embodiment, the tensioning member is for instance at least one of a belt, tape, chain and rope.

Still further in accordance with the first embodiment, the tensioning member is made for instance of at least one of LCP, UHMWPE, Aramid, Nylon, stainless steel, nitinol, tungsten, cotton.

Still further in accordance with the first embodiment, the tensioning member has for instance a body that is at least one of single strand, braided rope, stranded rope, woven, IWRC construction.

Still further in accordance with the first embodiment, at least one guard is provided for instance for at least one of the idlers, the at least one guard extending on both sides of the at least one idler such that a gap between the guard and the idler is less than a thickness of the tensioning member.

Still further in accordance with the first embodiment, the rotational output has for instance a spool, and wherein the tensioning member is wound on the spool so as not to overlap on itself.

Still further in accordance with the first embodiment, portions of the tensioning member extending from the idlers of the first set to the idlers of the second set are for instance generally parallel to a direction of said translation of the output.

Still further in accordance with the first embodiment, the actuator unit is for instance an electric motor and the rotational output is a spool on a shaft of the electric motor.

In accordance with a second embodiment of the present disclosure, there is provided a linear actuator configured to be connected between a platform and a structure or ground for displacement of the platform relative to the structure or the ground, the actuator comprising: a base, an output displaceable linearly relative to the base, a first plurality of idlers on the base, a second plurality of idlers on the output, an actuator unit having a reciprocating rotational output, a tensioning member having a first end connected to the rotational output of the actuator unit, and a second end connected to an anchor point on one of the output and the base, the tensioning member being routed from the rotational output, through the first plurality of idlers and the second plurality of idlers and to the anchor point for converting a winding/unwinding of the tensioning member into a translation of the output.

Further in accordance with the second embodiment, all of the idlers in the first plurality have for instance a common rotational axis.

Still further in accordance with the second embodiment, all of the idlers in the second plurality have for instance a common rotational axis.

Still further in accordance with the second embodiment, a rotational axis of the rotational output is for instance parallel to rotational axes of the first set of idlers and to the rotational axes of the second set of idlers.

Still further in accordance with the second embodiment, the output has for instance a frame having at least one sliding rod slidingly received in at least one bushing on the base.

Still further in accordance with the second embodiment, each said sliding rod is for instance slidingly received in at least a pair of the bushing.

Still further in accordance with the second embodiment, the frame has for instance a pair of the sliding rods interconnected by a shaft.

Still further in accordance with the second embodiment, all of the idlers in the second plurality are for instance rotatably mounted onto the shaft.

Still further in accordance with the second embodiment, the shaft is for instance perpendicular to the sliding rods.

Still further in accordance with the second embodiment, each said sliding rods are for instance slidingly received in at least a pair of the bushing, the shaft being located within a zone delimited by a first of the sliding rods and its pair of the bushings and a second of the sliding rods and its pair of the bushings.

Still further in accordance with the second embodiment, the first set of the idlers is for instance located in the zone.

Still further in accordance with the second embodiment, the anchor point is for instance connected to the base, in the zone.

Still further in accordance with the second embodiment, at least one routing idler is for instance provided for instance on the base between the rotational output and one of the first plurality and the second plurality of the idlers.

Still further in accordance with the second embodiment, the rotational output has for instance a spool with the first end of the tensioning member connected to the spool, a line extending from the first end to a proximal contact point of the tensioning member with the routing idler is at an angle of at least 5 degrees relative to a shortest from the proximal contact point to the spool.

Still further in accordance with the second embodiment, the base has for instance a plate.

Still further in accordance with the second embodiment, the output has for instance a ground abutment.

Still further in accordance with the second embodiment, a sensor monitors for instance a tension in the tensioning member.

Still further in accordance with the second embodiment, the sensor is for instance between the second end of the tensioning member and the base.

Still further in accordance with the second embodiment, there is provided for instance at least two arrangements of three of the idlers, each arrangement defined by two of the idlers sharing a common axis, and a third idler having an axis parallel to the common axis, the tensioning member being routed from a first of the two idlers, to the third idler, to a second of the two idlers, to the other of the two arrangements.

Still further in accordance with the second embodiment, the tensioning member is for instance one of a belt, tape, chain and rope.

Still further in accordance with the second embodiment, the tensioning member is for instance made of at least one of LCP, UHMWPE, Aramid, Nylon, stainless steel, nitinol, tungsten, cotton.

Still further in accordance with the second embodiment, the tensioning member has for instance a body that is at least one of single strand, braided rope, stranded rope, woven, IWRC construction.

Still further in accordance with the second embodiment, at least one guard is provided for instance for at least one of the idlers, the at least one guard extending on both sides of the at least one idler such that a gap between the guard and the idler is less than a thickness of the tensioning member.

Still further in accordance with the second embodiment, the rotational output has for instance a spool, and wherein the tensioning member is wound on the spool so as not to overlap on itself.

Still further in accordance with the second embodiment, portions of the tensioning member extending from the idlers of the first plurality to the idlers of the second plurality are for instance generally parallel to a direction of said translation of the output.

Still further in accordance with the second embodiment, the actuator unit is an electric motor and the rotational output is for instance a spool on a shaft of the electric motor.

Still further in accordance with the second embodiment, the second plurality of idlers are for instance distributed around a periphery of the output.

In accordance with a third embodiment of the present disclosure, there is provided a method for controlling a movement of a portion of a motion platform, comprising: obtaining a displacement value for a motion platform relative to a base; calculating at least one of angular position, angular speed and acceleration of a shaft of a motor transmitting movement to an output supporting the motion platform via a tensioning member; and actuating the motor to tension the tensioning member based on the at least one of the angular position, angular speed and acceleration.

DESCRIPTION OF THE PREFERRED EMBODIMENTS

Figure 1:
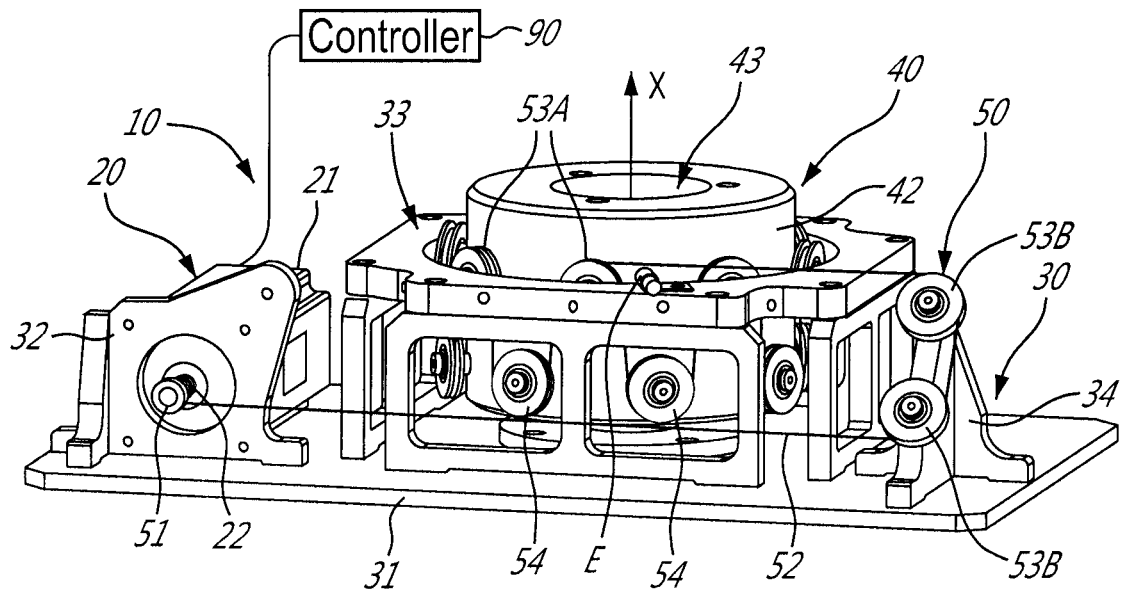
FIG. 1 is a perspective view of a linear actuator for motion simulators in accordance with the present disclosure.

Referring to the drawings and more particularly to FIG. 1, there is illustrated at 10 a linear actuator of the type used for motion simulators. The linear actuator 10 is well suited to be used between the ground and a motion platform (i.e., support surface, chair, seat, flight simulator/compartment, etc) to displace the motion platform in synchrony with a sequence of images and/or sound, for instance part of a motion picture, a televised event, a video, a video game, a simulation, haptic event, etc. The movements may be referred to as vibro-kinetic effects, for example. The linear actuator 10 of the illustrated embodiments is an electro-mechanical linear actuator that is driven by a motion controller, or any other appropriate and adapted source of motion signals (e.g., media player, D-cinema projector, internet, etc), i.e., code representing specific motions to be performed. The motion signal is sent to the linear actuator 10 in a suitable format to drive an actuator unit 20 thereof, for instance via a digital signal processor (DSP). In an embodiment, at least two of the actuator 10 are used concurrently to support and displace a seat relative to the ground. The linear actuator 10 therefore produces a translational output (a.k.a., translational degree of freedom (DOF)), along an axial direction thereof. When reference is made hereinafter to the axial direction, it will refer to the X axis of the linear actuator 10, unless stated otherwise, as shown in FIG. 1.

The linear actuator 10 has the actuator unit 20, a base 30, an output 40, and a transmission circuit 50.

The actuator unit 20 is configured to produce an actuation based on commands from a motion controller, the actuation being representative of movements to be produced by the linear actuator 10.

The base 30 is the structural component of the linear actuator 10, and therefore supports the various components of the linear actuator 10 and interfaces them with a structure, such as the ground, the floor, an end effector or a platform, a seat, for example.

The output 40 is operatively connected to the base 30, and is displaceable in reciprocating movement along the X axis. In an embodiment, the output 40 is constrained to the movement along the X axis. Although the expression "output" is used, the output 40 may be known as a piston, a sliding tube, among other names. Other DOFs or play may be present as well.

The transmission circuit 50 converts the actuation of the actuator unit 20 to a translation of the output 40.

Actuator Unit 20

Referring to FIG. 1, the actuator unit 20 may be a bi-directional motor of the type having a casing 21 with an output shaft 22. Although not shown, the casing 21 encloses a rotor with electrical components, in the case of an electric motor. Other types of motor may be used as well, such as hydraulic motor, pneumatic motor, etc. Actuator units such as linear output devices, such as pneumatic and hydraulic cylinders, as well as electric or electro-mechanical linear actuators may also be used. The expression "motor 20" is used herein for simplicity, for the actuator unit.

In the present disclosure, the motor 20 is described as winding a tensioning member, but if a linear actuator is used, the winding may not be necessary. The present disclosure focuses on a winding configuration, but also includes configurations without winding. Moreover, the shaft 22 may be indirectly connected to the motor 20, for instance by way of a gearbox or other conventional transmissions. The motor 20 may be equipped with any appropriate control devices, such as encoders. The shaft 22 may be directly used as a spool for winding or unwinding a tensioning member, or may support an add-on spool or roller, as explained hereinafter. Therefore, the use of the expression "shaft" may entail the possibility that the shaft is used as a spool.

Base 30

Referring to FIG. 1, the base 30 may have a plate 31 supporting the various components, although these components may be secured directly to a structure or the ground. The base 30 may have a bracket 32 for anchoring the motor 20. A peripheral rack structure 33 may be formed around the output 40, so as to support part of the transmission circuit 50, in a manner explained hereinafter. The rack structure 33 may have a bracket portion 34, also involved in supporting a part of the transmission circuit 50.

Figure 6:
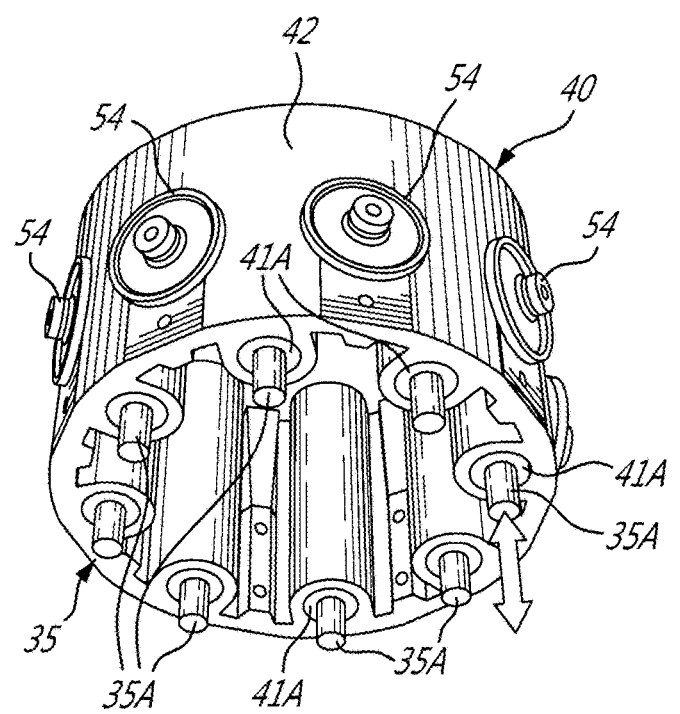
FIG. 6 is a perspective view of a guide structure with rods and bushings.

Referring to FIG. 6, the base 30 may also comprise a guide structure 35, cooperating with the output 40 to constrain its movements. As in FIG. 6, the guide structure 35 may be one or more rods 35A (a.k.a., posts) for sliding engagement of sleeves thereon, though the reverse arrangement is contemplated as well, with sleeves or bushings on the guide structure 35. For example, the guide structure may form a joint with a single translational degree of freedom (DOF) with the output 40. Therefore, the output 40 may be mechanically guided with the actuator base 30 as to prevent unwanted excess of lateral movements and/or some rotation, while letting free sliding movement, and some other rotations if desired. The output 40 may need to allow small lateral movements and some tilt to compensate for chair general rotation/tilt.

Output 40

In FIG. 6, the guide structure has the plurality of rods 35A aligned with axis X, cooperating with low-friction sliding bushings 41A in a body 42 of the output 40, to constrain movement of the output 40 to translation along the X axis. As mentioned above, the arrangement of FIG. 6 may be inverted, for example with the bushings 41A being connected to the base 30. Other coupling arrangements between the base 30 and the output 40 include non-exhaustively levers, anti-torsion bars, guiding wheels, etc. to redistribute the force around the periphery of the output 40.

Referring to FIG. 1, the body 42 of the output 40 is shown as being generally cylindrical. An interface 43, for instance in the form of a cavity, may be provided on top of the output 40 for interfacing the linear actuator 10 to a seat, a platform, etc. The output 40 may also be directly connected to the seat, platform, etc.

Figure 7:
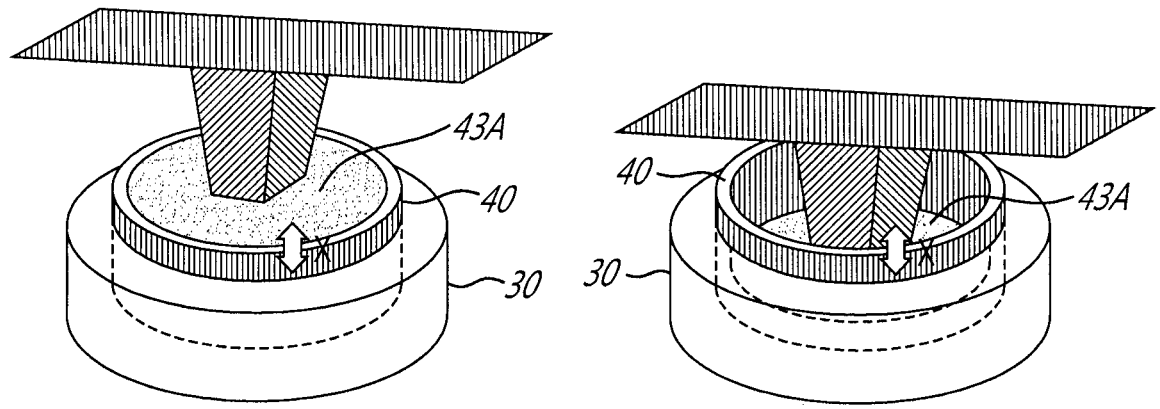
FIG. 7 is a schematic view of the linear actuator with concave interface.
Figure 8:
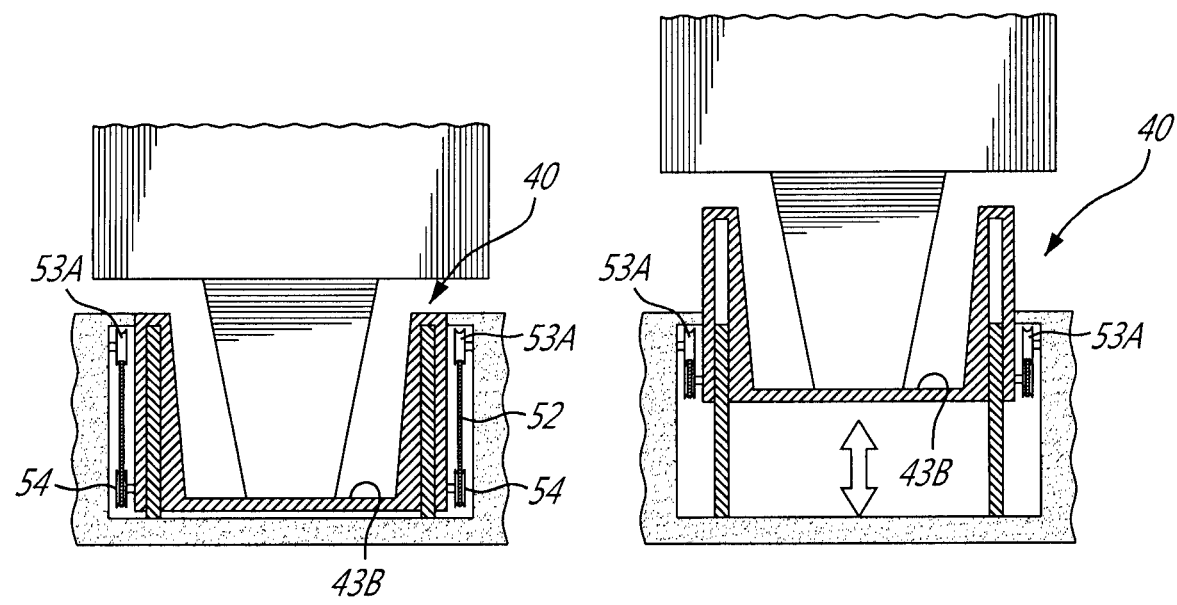
FIG. 8 is a schematic view of the linear actuator with concave channel.

The interface 43 may include threaded holes, rods, etc, depending on the nature of the item to which the linear actuator 10 will be connected. The body 42 may be a closed-end tube, to accommodate the coupling components. The interface 43 of the output 40 may also include a swivel pad to support chair leg and allow some rotation. The interface 43 may have a chair leg receiving surface of various shape: flat, concave, U or V grooves, self centering. The output 40 may receive a part of the chair other than a leg, such as an under structure, side wall, beam, etc. As shown in FIG. 7, the interface 43 may be a concave receptacle 43A letting the chair leg go through/inside the enclosure area and be in proximity to the floor. As in FIG. 8, the interface 43 may be a deep channel 43B going laterally through the enclosure area. The interface 43 can be a lifting plate outward of the enclosure and near the floor, with an anti-pinch protection. Spacers can be provided for cases where the chair has no legs or legs too small to be received in a concave configuration of the interface 43 (e.g., 43A, 43B). By the use of concavities in the interface 43 (e.g., 43A and 43B), the linear actuator 10 can be shaped to have a low profile (low height), as to be inserted between a seat leg and the floor without excessive gain in height, as shown in FIGS. 7-8.

Transmission Circuit 50

The transmission circuit 50 may optionally have a spool 51 (a.k.a., drum, take-up, take-up drum, wheel, winch portion) mounted on the shaft 22 of the motor 20, though the shaft 22 may act as a spool as well. A tensioning member 52 is connected at one end to the spool 51 or shaft 22 and at the other end to an anchor point E on the base 30 or output 40, while being operatively connected between its ends to a plurality of idler pulleys 53 and 54. While the expression tensioning member is used, the flexible material may be rope, cable, tape, belt, chain, etc, running through the two sets of pulleys 53 and 54 (or wheels, rollers such as multi-turn rollers with grooves and helical path, sprockets, depending on the nature of the tensioning member 52). For simplicity, when the expression tensioning member 52 and pulleys 53, 54 are used herein, they encompass the alternatives suggested above as well as other alternatives. The tensioning member 52 defines a circuit jumping between the sets of pulley 53, 54 to achieve a mechanical reduction factor proportional to the number of jumps.

The anchor point E in FIG. 1 of the tensioning member 52 is on top of the rack structure 33 of the base 30, but may be on the output 40 as well. In another configuration, the anchor point E is on a second spool rotatably engaged with the first spool 22, in such a way that both spools wind or unwind both ends of the tensioning member together. The idler pulleys 53 are shown as pulleys 53A and 53B. The pulleys 53A are mounted to the rack structure 33 and are intertwined with the pulleys 54 mounted to the output 40. The pulleys 53B are mounted to the bracket portion 34 of the base 30, and are optionally present as routing pulleys to direct the tensioning member 52 toward the pulleys 53A and 54. Two of the routing pulleys 53B are shown in FIG. 1, but fewer or more routing pulleys 53B may be used, if even used. Moreover, although the routing pulleys 53B are shown as being mounted to the base 30 in FIG. 1, one or more routing pulleys 53B may be on the output 40 as well. As observed, bearings may be provided as part of the pulleys 53 and 54 so as to help minimize the friction and improve the overall efficiency of the system. The bearings may be any appropriate type of bearing, including rolling element bearing, ceramic bearing, etc.

Figure 10:
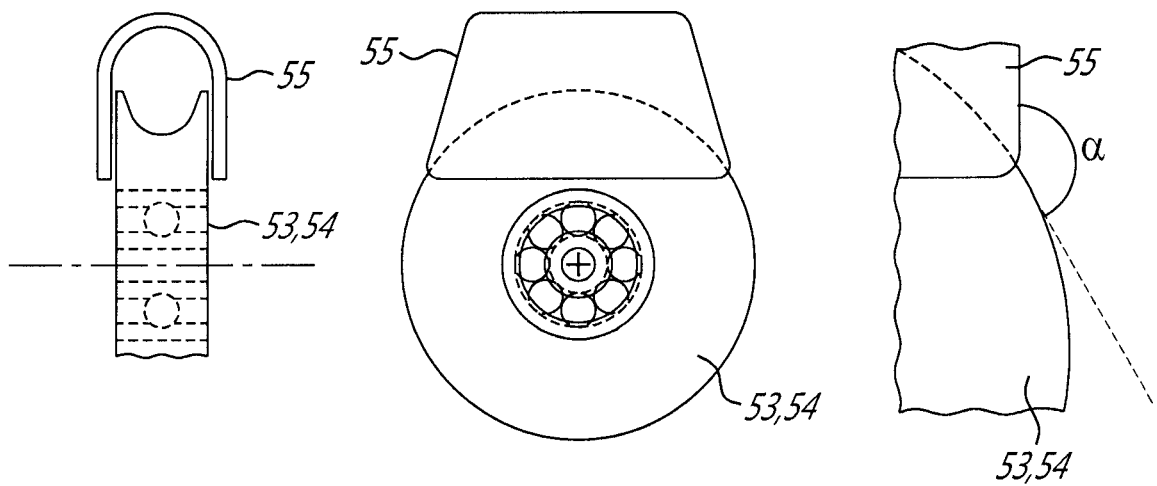
FIG. 10 are schematic views of the pulleys with restraint brackets.

As shown in FIG. 10, the pulleys 53, 54 may be equipped with a restraint bracket 55 on their exterior to prevent the tensioning member 52 from getting out of the pulley circuit in case of tension loss. The restraint bracket 55 may have its side walls in close proximity to each side of the pulley wheels to prevent pinching of the tensioning member 52, where the gap between the side walls and the pulley wheel should be sufficiently smaller than the thickness of the tensioning member 52, and where the angle $\alpha$ between the side wall and the pulley tangent is relatively large (>90 deg, closer to 180 deg). Other restraint mechanisms may employ restraint pulleys or rollers to maintain the tensioning member 52 between the main pulleys 53, 54 and restraint pulleys.

Hence, the linear actuator 10 converts mechanical energy from rotary to linear using a flexible material, namely the tensioning member 52 in the illustrated embodiment. In the embodiment of FIG. 1, the rotary shaft 22 winds and unwinds the tensioning member 52, for example on its spool 51, to decrease and increase the length of the tensioning member 52 extending from the shaft 22 to the anchor point E to achieve reciprocal movements. In the illustrated embodiment of FIG. 1, a pull force is exerted by winding the tensioning member 52 to raise the output 40. A release in the force at the shaft 22 will results in an unwinding of the tensioning member 52, and thus a lowering of the output 40 by gravity. The shaft 22 is however controlled so as not to allow unwinding beyond a desired length representative of a desired position of the output 40 along direction X. The winding and unwinding is as a function of the determined limit positions along direction X.

Figure 2:
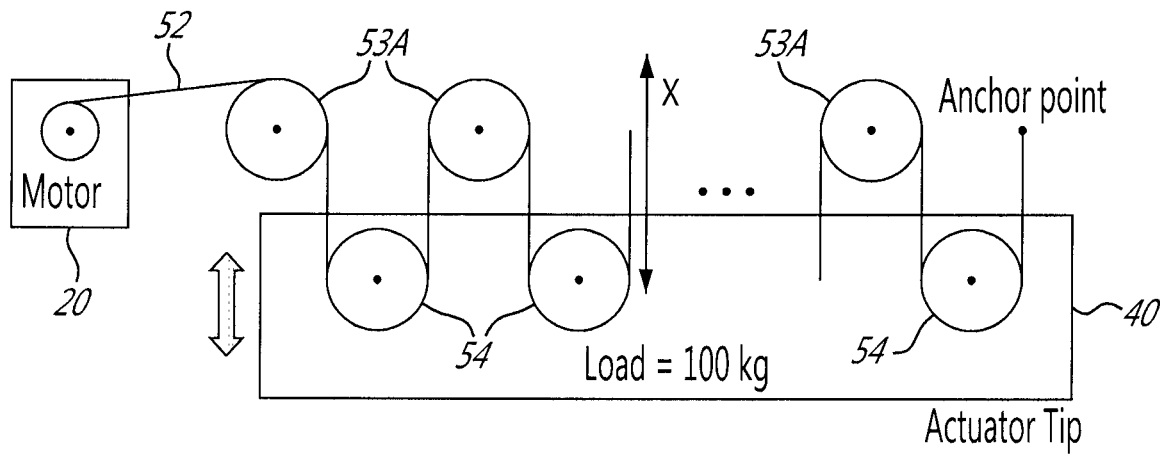
FIG. 2 is a schematic view of a linear actuator in accordance with the present disclosure, with a bar output.

As shown in FIG. 1, a high number of pulleys 53 and 54 (e.g., 16, 32, etc) can be arranged in a circular pattern, because of the cylindrical shape of the output 40. However, the body 42 of the output 40 may have other shapes, such as square, rectangle, horse-shoe, to name but a few of the possible shapes. For example, as shown in FIG. 2, the pulleys 53 and 54 may be arranged in a linear fashion, with the output 40 being a bar.

The conversion formula that may be used to correlate the revolutions of the shaft 22 to the linear displacement of the output 40 may be expressed as follows:

[Linear Displacement per Revolution]=[Winding Radius]*2*PI/[Pulley Reduction]

For instance, to achieve an actuator conversion of 2 mm (linear) per revolution, the tensioning member 52 can be wound over the motor shaft 22 having a radius of 5 mm and run through 16 pulleys jumps (5 mm*2*PI/16=2 mm/rev). A small actuator conversion (high reduction) can be achieved by using a high number of pulleys, therefore eliminating the need for a gear reduction stage. A pulley jump is a jump from one of the pulleys 53A to one of the pulleys 54, or vice versa. A pulley jump may also include a jump from the spool 22 to one of the pulleys 53A or 54, and a jump from one of the pulleys 53A and 54 to the anchor point E. The rotary shaft 22 may have to wind a finite number of revolutions of the tensioning member 52, related to the reciprocal movement maximum amplitude to be achieved, for instance 18.1 revolutions. This combination can offer a high bandwidth in actuator reciprocal movements (0-100 Hz), even at relatively high loads (>200 lb).

The tensioning member 52 is the main force handler between the motor 20, the base 30 and the output 40. Hence, the tensioning member 52 may be chosen with properties of minimum stretch (elongation or elasticity), minimum creep (long term elongation), but with maximum abrasion resistance, flex resistance and tensile breaking strength. The tensioning member 52 allows to relocate and reorient the mechanical energy in space by the routing of the pulleys 53B that change the orientation of the tensioning member 52. Therefore, by this relocating, a compact low-profile form factor may be achieved with the linear actuator 10.

The tensioning member 52, in the form of a belt, tape or rope may be any appropriate composition of flexible material: synthetic (LCP, UHMWPE, Aramid, Nylon), metal (stainless steel, nitinol, tungsten), organic (e.g., cotton). The tensioning member 52 may have different constructions, including single strand, braided rope, stranded rope, woven tape, IWRC (7×14 . . . ), rigid chain assembly. The tensioning member 52 may be part of a composition, such as a mixed composition, BOB® (Braid Optimized for Bending), with covering sleeve and/or coating. A first flexible material can be combined with a second flexible material, for example with greater flexibility to improve lifetime, either by mixing fibers (inter-braided) or by creating an outer sleeve. The tensioning member 52 can also change construction and composition in the transmission circuit 50, with optional joints, such as pulleys, unions, levers, crimps, etc.

Figure 4:
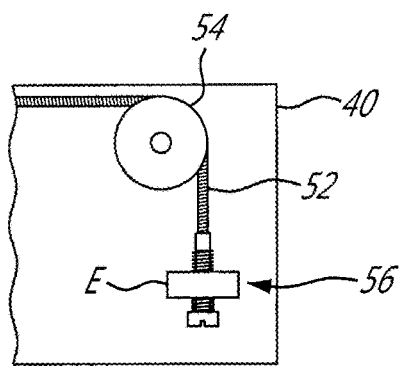
FIG. 4 is a side view of an adjustable offset mechanism for the tensioning member anchor point.
Figure 5:
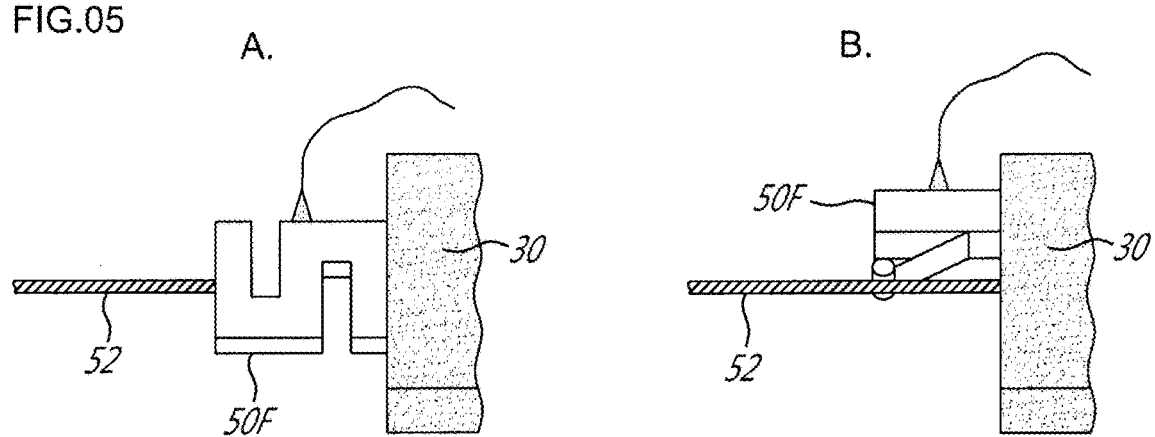
FIG. 5 are schematic views of a sensor in series or parallel with the tensioning member at the anchor point.

Referring to FIG. 5, the distal end of the tensioning member 52, i.e., the end that is away from the motor 20, can be linked to a force measurement sensor 50F to measure the tensile force in the tensioning member 52. The force measurement sensor 50F may be installed in the tensile direction by being in series with the tensioning member 52 (FIG. 5A) at the anchor point E, or in parallel by measuring the deformation of the tensioning member 52 (FIG. 5B). In the case of parallel force measurement, the measurement may be made anywhere along the tensioning member 52, not necessarily at the anchor point E. The force measurement sensor 50F can be a load cell, strain gauges, piezoelectric elements, variable capacitance, piezoresistive sensors, etc. Tensile force sensors 50F can provide information on the tension and thus ensure that there is sufficient tension in the tensioning member 52 during unwinding, or that the platform used in conjunction with the linear actuator 10 is not overloaded. Referring to FIG. 4, the distal end of the tensioning member 52, can be tied to the anchor point E using an adjustable offset mechanism 56 for fine adjustment of the height of the output 40 or tension in the tensioning member 52. The adjustable offset mechanism 56 may include a set screw mounted at the anchor point E, an end of the set screw being tied to the tensioning member 52. The adjustable offset mechanism 56 be used in conjunction with the force measurement sensor 50F.

Figure 3:
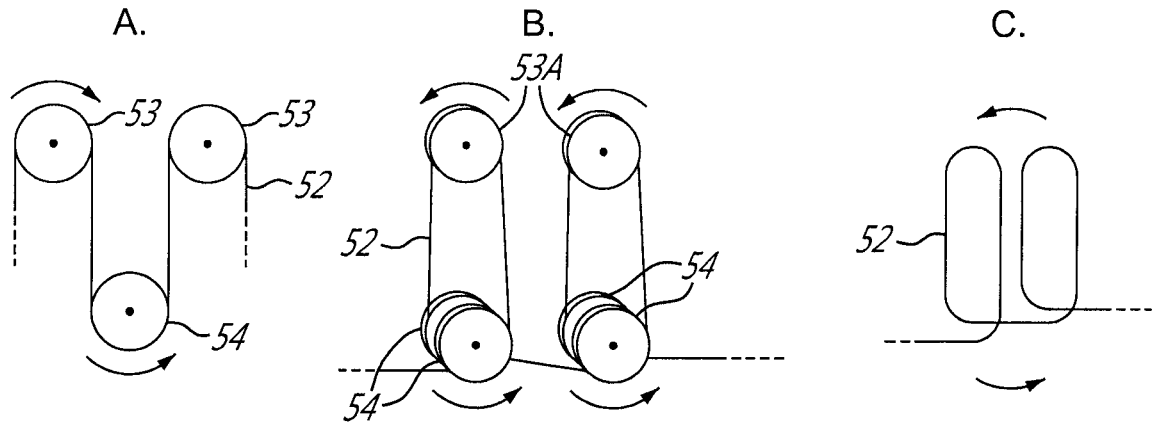
FIG. 3 is a schematic view of a pulley arrangement in accordance with the present disclosure.
Figure 9:
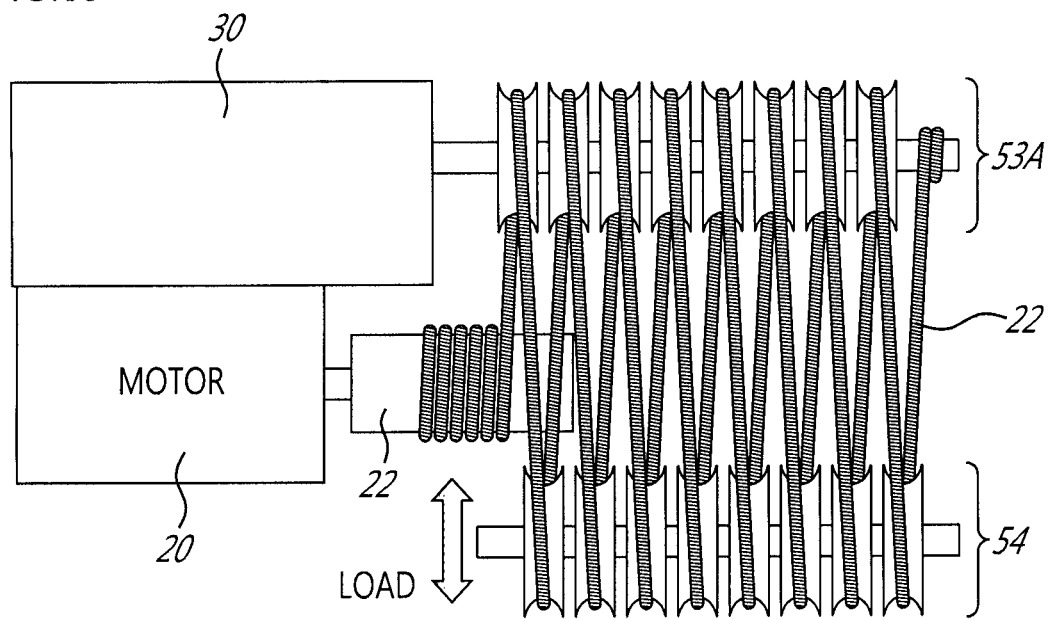
FIG. 9 is a plan view of another transmission circuit arrangement.

A minimum of two axes of rotation is required, one for each set of pulleys 53 or 54. An example of one axis for each set of pulleys 53A and 54 is shown in FIG. 9, in which reverse bending is avoided. Also, a pair of pulleys may be used at a same pulley point (i.e., sharing a common axis), to avoid reverse bending in a multiple axis configuration (e.g. FIG. 1), as opposed to a common axis configuration as in FIG. 9. FIG. 3 shows in B and C such a configuration or arrangement, with dual pulleys 54 for each pulley 53A. The reverse arrangement is also possible, i.e., dual pulleys 53A for each pulley 54.

The pulleys 53 and 54 may be made of any appropriate material, such as nylon, metal. In terms of properties, the pulleys 53, 54 may be made of a material having low abrasion, low friction and/or a smooth finish. It is considered to provide a force gradient across the pulleys 53 and 54. According to an embodiment, the pulleys 53 and 54 proximal to the motor 20 oppose slightly more force than the distal pulleys 53 and 54. The pattern of the transmission circuit 50 can be sinusoidal-like, as in FIG. 1. The expression sinusoidal-like is used, but as observed in FIG. 2, the pulleys 53A and 54 can be aligned in such a way that jumps by the tensioning member 52—from one pulley 53A to the adjacent pulley 54—are generally parallel to each other, and generally parallel to the axis or direction X (±5 degrees of the axis or direction X when projected on a common plane).

In order to facilitate maintenance, it is considered to package the transmission circuit 50, including the tensioning member 52 and pulleys 53, 54 in a removable cassette. This would enable users to interchange transmission circuits, to install a replacement cassette with a new tensioning member 52 to extend the life of the linear actuator 10.

Figure 11:
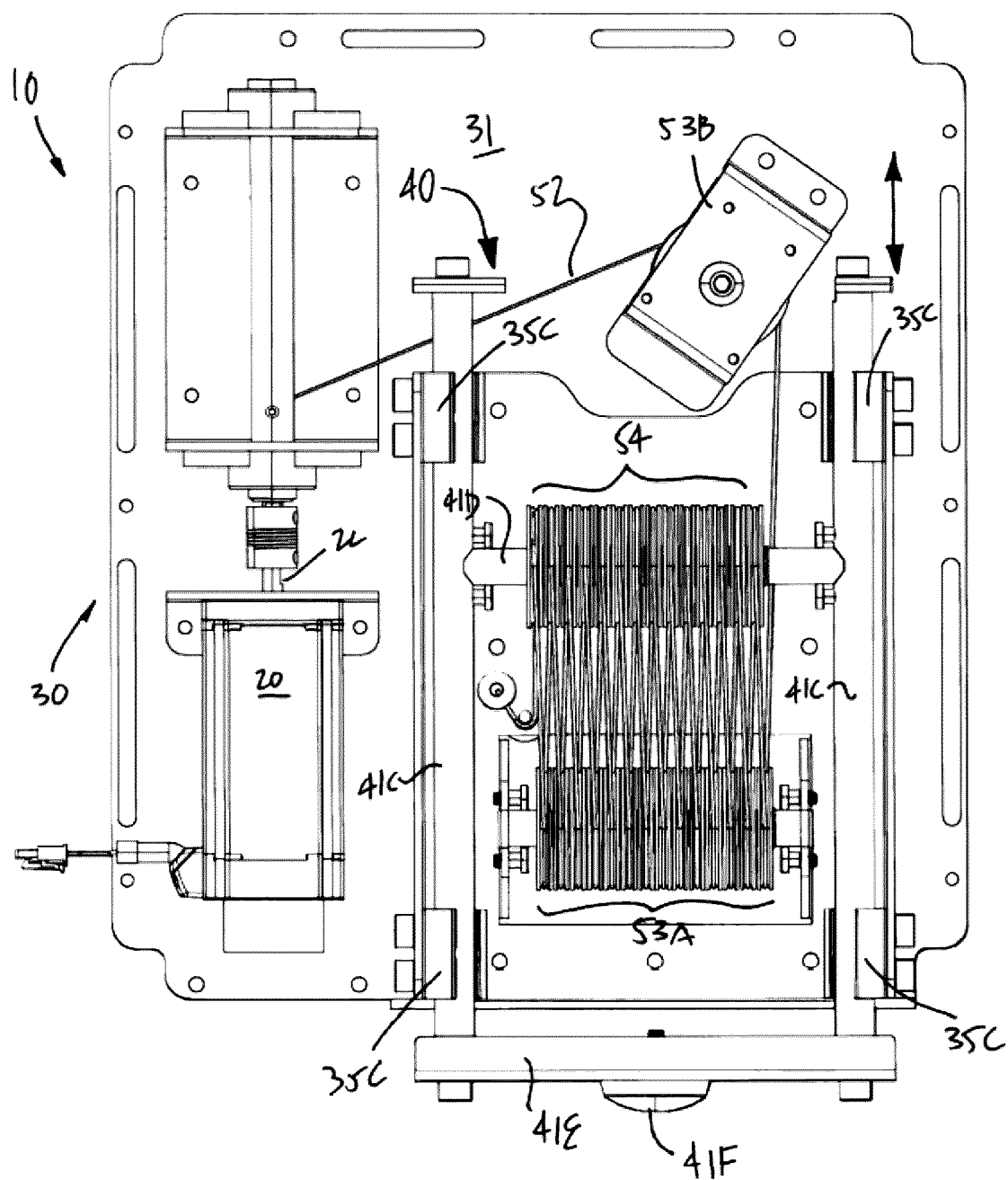
FIG. 11 is a plan view of a linear actuator with an implementation of the transmission circuit arrangement of FIG. 9.
Figure 12:
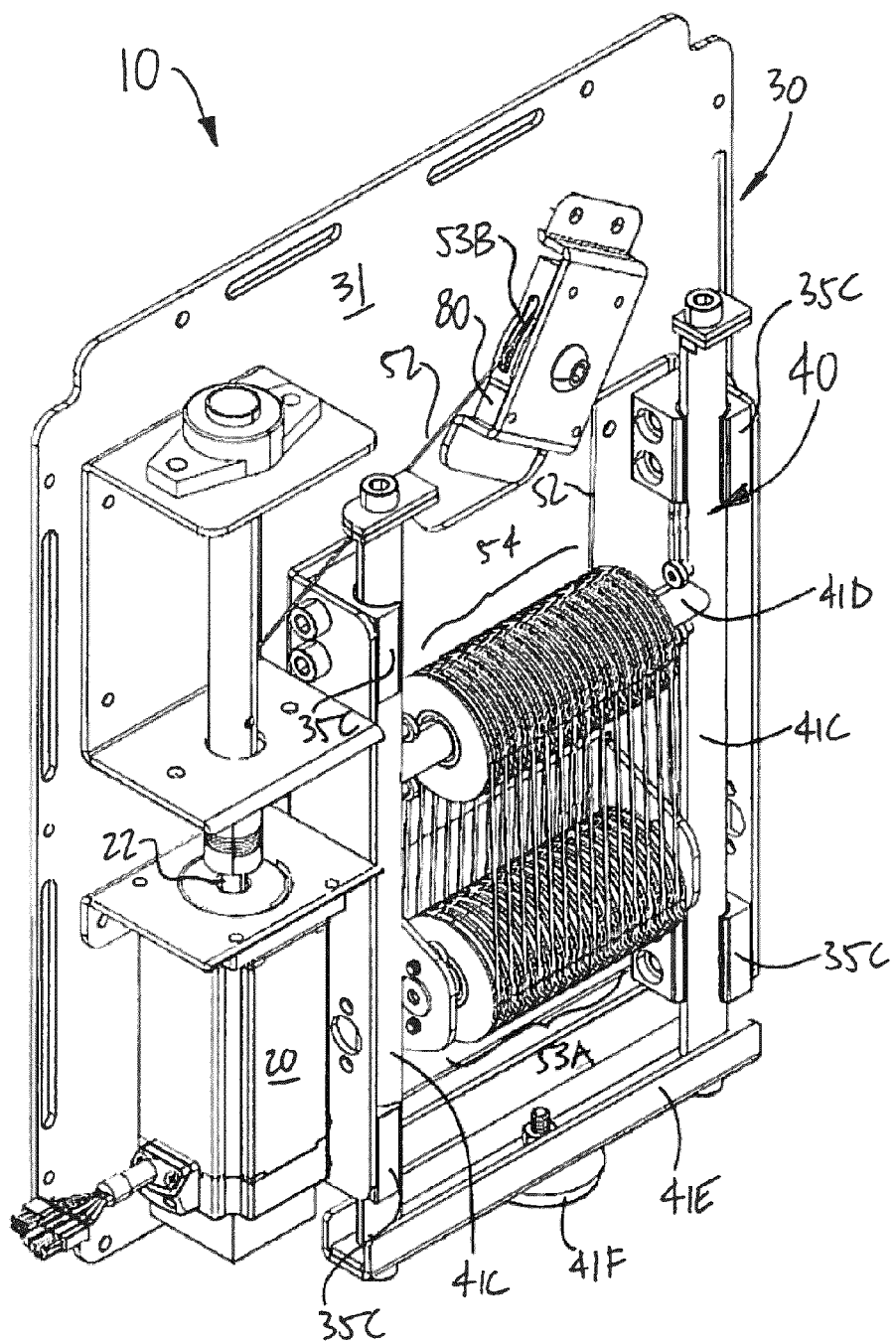
FIG. 12 is a perspective view of the linear actuator with the implementation of the transmission circuit arrangement of FIG. 11.

Referring concurrently to FIGS. 11 and 12, an implementation of a linear actuator 10 with the transmission circuit arrangement of FIG. 9 is shown in greater detail, with like reference numerals representing like components. As observed from the figures, the linear actuator 10 of FIGS. 11 and 12 may be used with the plate 31 oriented upright or vertical, although other orientations are contemplated as well. The plate 31 therefore has attachment holes for being anchored to a motion platform, or in a reverse arrangement, to a grounded structure. As the motor 20 is shown as having its shaft 22 vertical, a routing pulley 53B is present as well. The routing pulley 53B may be positioned relative to the shaft 22 in such a way that the tensioning member 52 lies in a plane from its foremost contact point with the shaft 22 through its winding on the routing pulley 53B. The plane would include a tangent surface to the shaft 22 at its foremost contact point with the tensioning member 52 and the proximal point of contact with the routing pulley 53B. The foremost contact point is defined as the last point of contact of the tensioning member 52 with the shaft 22 (or spool if present) toward the routing pulley 53B. In a further embodiment, the tensioning member 52 may also lie in this plane from the routing pulley 53B to the foremost contact point with one of the pulleys 53A. It is also observed that a distance between the shaft 22 and the routing pulley 53B may be substantially greater than a diameter of either one of the shaft 22 and of the routing pulley 53B (for example at least 5 times). This spacing may assist the tensioning member 52 in not being wound on itself. Moreover, as shown in an embodiment of FIG. 15, the attachment point of the tensioning member 52 on the shaft 22 (or spool) may be at an angle α from a line LIII-LIII, the line LIII-LIII being perpendicular in a plane view to the rotational axis of the shaft 22, to which plane view an axis of rotation of the routing pulley 53B is generally normal. In an embodiment, angle α is of at least 15 degrees from line LIII-LIII. The line LIII-LIII may also or alternatively be defined as the shortest distance between the foremost points of contact of the tensioning member 52 with the shaft 22 and with the routing pulley 53B, or as a shortest distance from the proximal contact point to the spool. This may cause a variable spacing between spiral portions of the tensioning member 52. It is pointed out that the winding of the tensioning member 52 could go beyond line LIII-LIII.

Figure 15:
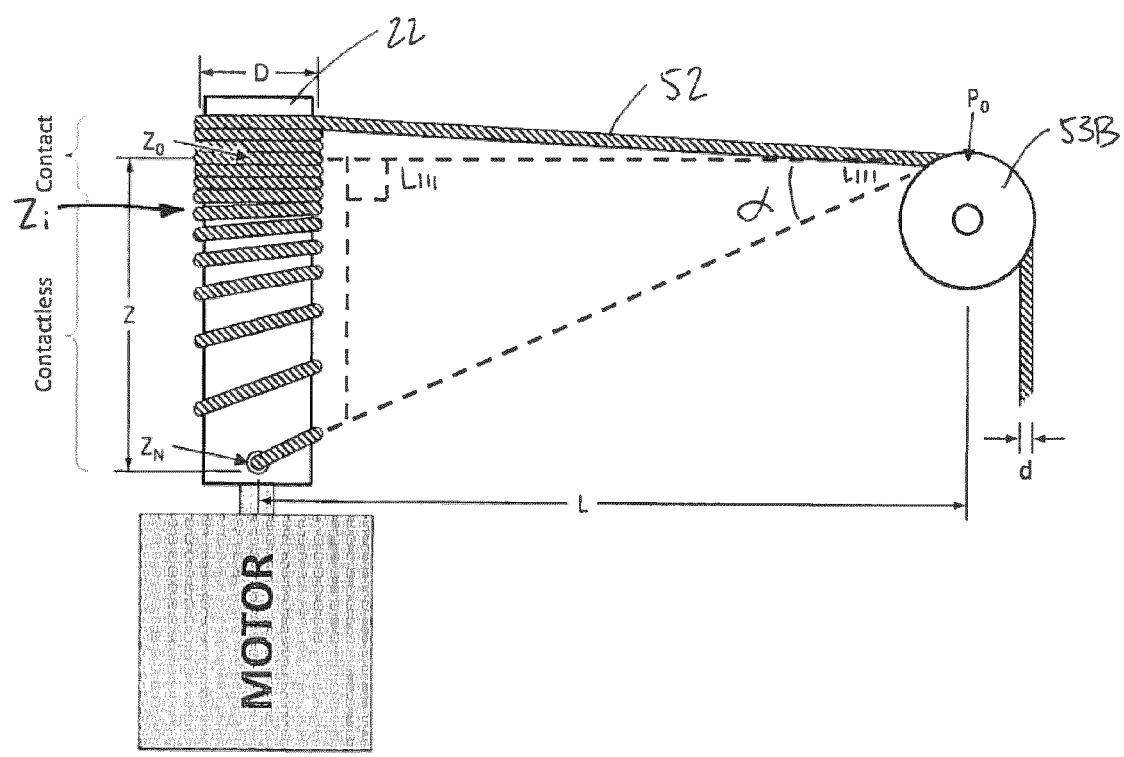
FIG. 15 is a schematic view showing an angle range between a routing pulley and a shaft in an embodiment of the linear actuator of the present disclosure.

More specifically, still referring to FIG. 15, there is provided formula C giving a geometry coefficient that simplifies further computation:

$$C = e^{\left(\frac{2\pi}{\sqrt{\left(\frac{2L}{D}\right)^2 - 1}}\right)}$$

and formula Z giving the minimal length of the shaft required to wind N turns from an anchor point $Z_N$ to a perpendicular point $Z_0$:

$$Z = \left(\frac{d}{C-1}\right) * C^{\left(N - \frac{1}{C-1}\right)} \text{ when } N \geq \frac{1}{C-1}$$

in which $P_0$ is the tensioning member point of contact with a first pulley (here 53B) after exiting the winding shaft; $Z_0$ is the section on the winding shaft where the tensioning member becomes perpendicular to the axis of rotation of the shaft (perpendicular point); $Z_N$ is the section on the winding shaft where the tensioning member cannot further unwind (anchor point); L is the shortest distance from the center of the winding shaft to the center of the first pulley; D is the effective winding diameter (shaft diameter, including the thickness of the tensioning member being winded); d is the diameter of the tensioning member (its width when winded on the shaft); and N is the number of winding turns on the shaft from $Z_0$ to $Z_N$ as illustrated in FIG. 15. Moreover, with $N_i=1/(C-1)$, it is possible to determine the distance $Z_i$ (from $Z_0$) at which the tensioning member 52 is not in contact with its adjacent winding. For example, if D=20 mm, d=1 mm, L=200 mm, C is 1.3696. If it is desired to wind the tensioning member 52 twelve times, N=12 and Z is 50.3 mm. Accordingly, with a shaft 22 of at least 51 mm it is possible to achieve twelve windings until perpendicularity is reached, and $N_i$=2.7 so the last 2.7 windings (or turns) will touch, but the first 9.3 turns would not touch. This formula allows the selection of dimensions by which tensioning member overlap may be avoided, or to prevent contact of the tensioning member 52 with itself. It may for example be possible to increase the length of the shaft 22 for these purposes.

Referring to FIGS. 11 and 12, the transmission circuit has two stacks of pulleys 53A and 54 to create a reduction factor as described above. One particularity of the linear actuator 10 of FIGS. 11 and 12 is the use of bushings 35C (or equivalent sliding joint component) secured to the plate 31 by brackets, and slidingly supporting a pair of sliding rods 41C. The output 40 is defined by sliding rods 41C forming a H-shaped structure with a shaft 41D common to the pulleys 54. An additional stiffening bracket 41E may be provided at an end of the H-shaped structure to further stiffen the output 40, with a ground abutment 41F optionally present. In an embodiment, the ground abutment 41F is the support point of the linear actuator 10 with the ground, while the platform 30 moves with the motion platform (although a reverse arrangement is also contemplated). The arrangement of FIGS. 11 and 12 has four sliding joints formed concurrently by the bushings 35C and the sliding rods 41C to define one translation degree of freedom for the output 40, i.e., a vertical translation in the illustrated embodiment due to the vertical orientation of the output 40. For clarity, the translation is described as a vertical translation based on the orientation of the linear actuator 10 in FIGS. 11 and 12, but other orientation are contemplated to use the linear actuator 10 to pull or push. The plate 31 may for example lay flat on a ground to push or pull on a wedge that would raise and lower a load, as an example. In an embodiment, the four sliding joints are spaced apart vertically, i.e., the two upper sliding joints vs the two lower sliding joints, by a distance that is greater than the spacing between the axes of rotations of the pulleys 53A and 54, by at least a ratio of 1.5. However, it is also contemplated to have a ratio lower than 1.5. Likewise, the four sliding joints are spaced apart horizontally, i.e., the two right-side sliding joints vs the two left-side sliding joints, by a distance that is greater than the spacing between the left-most and right-most pulleys 53A and 54. In another embodiment, the vertical spacing is greater than the horizontal spacing. Moreover, additional sets of sliding joints may be present, with the ratios mentioned above being between the extremity sliding joints. These arrangements are efficient in countering side loads and force gradients caused by the pulleys 53A and 54. It is also observed that the pulleys 53A and 54 are enclosed in an imaginary box defined at its corners by the bushings 35C. The force between the pulleys 53A and 54 may be greater toward a right-hand side because of the proximity to the pull of the motor 20, but such a force gradient is countered by the geometry of the output 40, notably the location of the sliding joints. Any appropriate connector may be used for the connection of a platform, seat, etc to the plate 31 or to the output 40, to displace the platform, seat, etc, in reciprocating motion. In the illustrated embodiment, the ground abutment 41F may be against the ground, but could also be oriented upwardly to push upwardly a platform.

Figure 13:
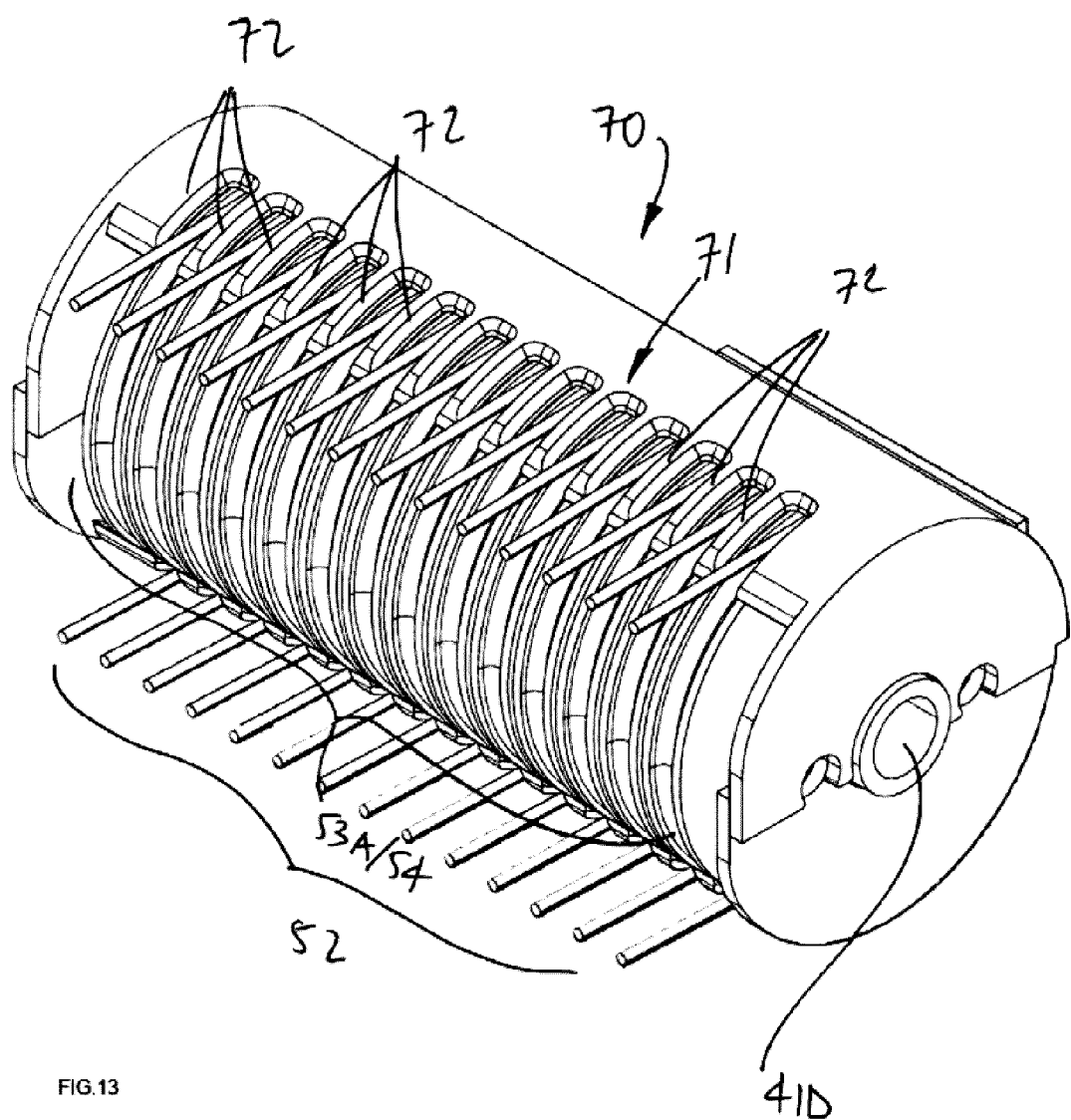
FIG. 13 is a perspective view of a guard for tensioning member for a stack of pulleys.
Figure 16:
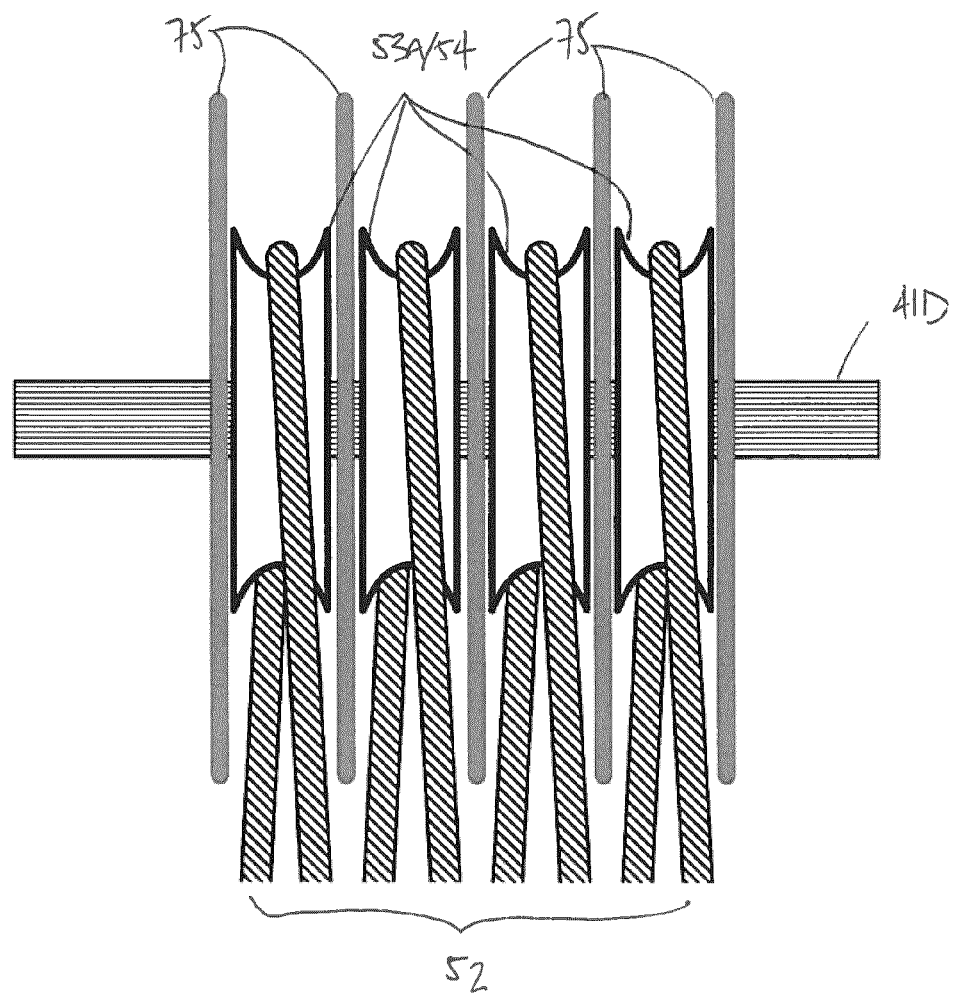
FIG. 16 is an elevational view of a guard for tensioning member for a stack of pulleys, in accordance with another embodiment.

Referring to FIG. 13, a guard for tensioning member is generally shown at 70, and is used with stacks of pulleys, such as those shown in 53A and 54 in FIGS. 11 and 12. The guard 70 is used to ensure that the tensioning member 52 remains aligned with the pulleys 53A and 54 if, for some reason, the tensioning member 52 were to loosen. According to an embodiment, the guard 70 comes in two generally hemi-cylindrical halves, or shells, each having a comb-like section 71. The teeth 72 of the comb-like section are spaced apart by a distance equivalent to a spacing between the pulleys 53A or 54, and the shells are in close proximity to the outer periphery of the pulleys 53A and 54, to ensure that the tensioning member 52 stays captive on the pulleys 53A and 54 instead of jumping laterally between pulleys. According to an embodiment, the shells are attached to a shaft of the pulley stacks, such as shaft 41D (FIGS. 11 and 12). The teeth 72 are sized so as to cover the pulley side-walls, such that the cavities between teeth 72 only expose the pulley grooves. The configuration of the guard 70, with the comb-like section 71, although not necessary, and/or with the halves, allows the positioning of the guard 70 after installation of the tensioning member 52 on the pulleys 53A or 54. As also observed, the edge surfaces of the guard 70 may also be shaped so as not to define any acute angle that would wedge the tensioning member 52 between the pulleys 53A and 54 and the guard 70. Instead, the edge surfaces of the guard 70 that are proximal to the pulleys 53A and 54 may have obtuse angles (e.g., greater than 120 degrees). Also, as shown in FIG. 16, a guard for stacks of pulleys 53A and/or 54 may be in the form of walls 75 between pulleys 53A and/or 54, for example in the form of disks.

Figure 14:
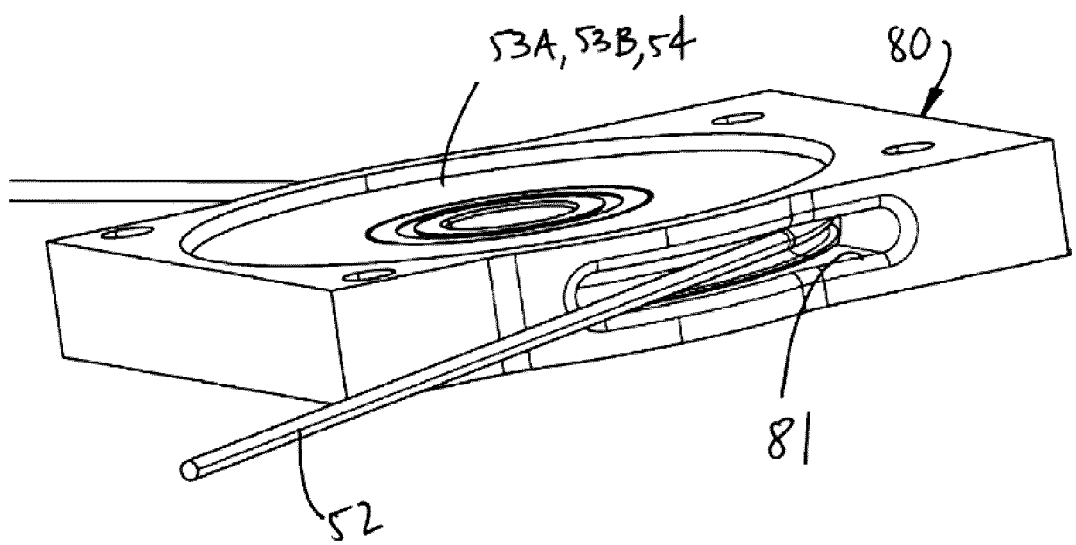
FIG. 14 is a perspective view of a guard for tensioning member for a single pulley.

FIG. 14 shows another configuration of a guard, at 80. The guard 80 is of the type that surrounds a pulley (e.g., 53A, 53B, 54) by forming a frame around it, while supporting its rotation. A pair of slots 81 are defined in side walls of the guard 80 to define the inlet and outlet of a passage for the tensioning member 52. The slots 81 are sized so as to cover the pulley side walls, to expose only the pulley groove. In an embodiment, the guard 80 is of the type used with individual pulleys, as opposed to being used with a stack like the guard 70 of FIG. 13. Unless the guard 80 is separable in halves (e.g., with a plane of separation in a normal relation with an axis of rotation of the pulley), the guard 80 of FIG. 14 must be installed about the pulley prior to the installation of the tensioning member 52.

In a non-limiting embodiment, the linear actuator 10 may have specific dimensions for use in motion platforms, in which the output may perform numerous short distance reciprocal displacements. The displacements may be less than 20 cm (e.g., 4 cm in an embodiment), and the linear actuator 10 may perform thousands to multiple millions of such displacements. In an embodiment, the winding diameter of the shaft 22 is of at least 12 mm. In another embodiment, the winding diameter of the shaft 22 is of 17 mm. In another embodiment, the pulleys 53A, and/or 54 have a diameter of at least 30 mm, with a diameter of 45 mm in another embodiment. This embodiment may or may not include the routing pulley 53B. In yet another embodiment, the linear actuator 10 has a combined total of at least 8 pulleys 53A and 54, with an embodiment featuring a combined total of 18 pulleys 53A and 54.

Safety and Environment Considerations

If the motor 20 is shut off, the motor inertia combined with pulley multiplication factor should limit the falling acceleration. The actuation may be stopped if a substantial change in weight/current sensed, and restarted after a pause (e.g., seconds) if tension is still sensed in tensioning member 52, and thus it has not ruptured. Actuation may be stopped if tensioning member 52 wear is detected. The use of multiple ropes may enable detection of failure of one of the ropes, without dropping the load (chair). Actuation may be stopped if interference is detected between actuators, using optical sensors (laser, infrared, reflectors, etc.). Optical sensors can be used to exchange information on layout of actuators on floor, actuator id being encoded in light beam, or detecting a reflective pattern. Passive vertical spacers can have reflectors to inform their presence to actuators. A non-linear mechanical damper system may be used to limit the falling speed when the speed is above a threshold, in case a cable breaks. For example, acceleration near 1 g downward locks a damper in the mechanical chain. A spring or shock absorber may be installed at the bottom of the actuator to soften the falling impact of a breaking cable.

The output 40 may be equipped with inertial sensors to measure operation parameters of the linear actuator 10. For example, one or more accelerometers may be positioned on the body 42 of the output 40 to measure the effective acceleration of the output 40 under load and to be able to compensate for high frequency vibrations according to flexible material elasticity. The accelerometers can also monitor the usage of the linear actuator 10, to determine whether the usage was appropriate. For example, excessive accelerations can indicate that the actuator 10 has been improperly used, for instance if damaged. Likewise, the output 40 may comprise one or more force sensors to measure the effective load or load distribution over the body 42. The force measurement sensor may include one or more of a load cell, strain gauges, piezoelectric elements, variable capacitance sensors, piezoresistive sensors, etc. Linear encoders can be used in the output extension. Also, encoders can be mounted directly over tensioning member 52. Encoders can be mounted on a pulley 53, 54 and detect tensioning member rupture.

Rubber isolators placed under the base 30. Rubber isolators may be placed on the sides of the base 30. The motor 20 may be provided with minimal contact points to minimize sound propagation. A microphone-array spread over one or many linear actuators may be to listen to environment sound from a specific spatial direction, and exclude noise generated from the actuators. In FIG. 1, a controller is generally shown at 90. The controller 90 controls the linear actuator 10 to displace the output 40 in accordance with a desired displacement of the motion placement. For example, the controller 90 has a module that obtains a displacement value for a motion platform relative to the base 30. The controller 90 calculates the angular position, angular speed and/or acceleration of the shaft 22 of the motor 20 transmitting movement to the output 40 supporting the motion platform via the tensioning member 52. The motor 20 is actuated to tension the tensioning member 52 based on the angular position, angular speed and/or acceleration. The controller 90 may calculate a compensation to be applied to preserve a linear reciprocal displacement pattern even though the rotary radius is changing. Such compensation can be applied using a lookup table or a mathematical formula approximation.

The invention claimed is:

1. A linear actuator configured to be connected between a platform and a structure or ground for displacement of the platform relative to the structure or the ground, the actuator comprising:
   a base,
   an output displaceable linearly relative to the base,
   an actuator unit having a reciprocating rotational output, the rotational output having a spool,
   at least one idler rotatably mounted on at least one of the output and the base,
   at least one routing idler on the base between the rotational output and the at least one idler,
   a tensioning member having a first end connected to the spool,
   wherein a line extending from the first end to a proximal contact point of the tensioning member with the routing idler, the line being at an angle of at least 5 degrees relative to a shortest distance from the proximal contact point to the spool,
   wherein a second end of the tensioning member is connected to an anchor point on one of the output and the base, the tensioning member being routed sequentially from the rotational output, through the routing idler, through the at least one idler, and to the anchor point for converting a winding/unwinding of the tensioning member into a translation of the output.

2. The linear actuator according to claim 1, comprising a plurality of the at least one idler on the base, and a plurality of the at least one idler on the output.

3. The linear actuator according to claim 1, wherein a first set of a plurality of the at least one idler on one of the base and the output, all of the idlers in the first set having a common rotational axis, a second set of a plurality of the at least one idler on the other of the base and the output, all of the idlers in the second set having a common rotational axis.

4. The linear actuator according to claim 3, wherein the tensioning member being is sequentially from the rotational output, through the first set and the second set of the plurality of idlers in an alternating sequence between the first set and the second set for the plurality of idlers of the first set and of the second set, and to the anchor point for converting a winding/unwinding of the tensioning member into a translation of the output.

5. The linear actuator according to claim 4, wherein portions of the tensioning member extending from the idlers of the first set to the idlers of the second set are generally parallel to a direction of said translation of the output.

6. The linear actuator according to claim 1, wherein the tensioning member is made of at least one of liquid crystal polymer, ultra-high molecular weight polyethylene, aramid, polyamid, stainless steel, nitinol, tungsten, cotton.

7. The linear actuator according to claim 1, wherein the tensioning member has a body that is at least one of single strand, braided rope, stranded rope, woven, IWRC construction.

* * * * *